United States Patent
Pandey et al.

(10) Patent No.: US 12,204,653 B2
(45) Date of Patent: Jan. 21, 2025

(54) SYSTEM AND METHOD, IN PARTICULAR COMPUTER IMPLEMENTED METHOD FOR DETERMINING A PERTURBATION FOR ATTACKING AND/OR VALIDATING AN OBJECT TRACKER

(71) Applicant: Robert Bosch GmbH, Stuttgart (DE)

(72) Inventors: Anurag Pandey, Frankfurt Am Main (DE); Jan Hendrik Metzen, Boeblingen (DE); Nicole Ying Finnie, Renningen (DE); Volker Fischer, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 335 days.

(21) Appl. No.: 17/738,316

(22) Filed: May 6, 2022

(65) Prior Publication Data

US 2022/0374526 A1 Nov. 24, 2022

(30) Foreign Application Priority Data

May 19, 2021 (DE) ...................... 10 2021 205 096.4

(51) Int. Cl.
*G06F 21/57* (2013.01)
*G06V 10/74* (2022.01)
*G06V 10/776* (2022.01)
*G06V 10/82* (2022.01)

(52) U.S. Cl.
CPC .......... *G06F 21/577* (2013.01); *G06V 10/761* (2022.01); *G06V 10/776* (2022.01); *G06F 2221/034* (2013.01); *G06V 10/82* (2022.01)

(58) Field of Classification Search
CPC ............ G06F 21/577; G06F 2221/034; G06V 10/761; G06V 10/776; G06V 10/82
See application file for complete search history.

(56) References Cited

U.S. PATENT DOCUMENTS

2015/0334267 A1* 11/2015 Hirakawa .............. H04N 5/144
348/242

FOREIGN PATENT DOCUMENTS

DE 102019201990 A1 8/2020

OTHER PUBLICATIONS

Ding L, Wang Y, Yuan K, Jiang M, Wang P, Huang H, Wang ZJ. Towards universal physical attacks on single object tracking. InProceedings of the AAAI Conference on Artificial Intelligence May 18, 2021 (vol. 35, No. 2, pp. 1236-1245). (Year: 2021).*
Hung WC, Kretzschmar H, Lin TY, Chai Y, Yu R, Yang MH, Anguelov D. Soda: Multi-object tracking with soft data association. arXiv preprint arXiv:2008.07725. Aug. 18, 2020. (Year: 2020).*

(Continued)

*Primary Examiner* — David Perlman
(74) *Attorney, Agent, or Firm* — NORTON ROSE FULBRIGHT US LLP; Gerard A. Messina

(57) ABSTRACT

A system and method, in particular computer implemented method for determining a perturbation for attacking and/or validating an association tracker. The method includes providing digital image data that includes an object, determining with the digital image data a first feature that characterizes the object, providing in particular from a storage a second feature that characterizes a tracked object, determining the perturbation depending on a measure of a similarity between the first feature and the second feature.

11 Claims, 2 Drawing Sheets

(56) References Cited

OTHER PUBLICATIONS

Wojke et al., "Simple Online and Realtime Tracking With a Deep Association Metric," Cornell University, 2017, pp. 1-5. <https://arxiv.org/pdf/1703.07402.pdf> Downloaded May 5, 2022.
Bernardin and Stiefelhagen: "Evaluating Multiple Object Tracking Performance: The Clear MOT Metrics," EURASIP Journal on Image and Video Processing, (2008), pp. 1-10.
Lipton, et al.: "Moving Target Classification and Tracking from Real-time Video," Proceedings of 4th IEEE Workshop on Applications of Computer Vision, WACV'98, IEEE, (1998), pp. 1-7.

* cited by examiner

SYSTEM AND METHOD, IN PARTICULAR COMPUTER IMPLEMENTED METHOD FOR DETERMINING A PERTURBATION FOR ATTACKING AND/OR VALIDATING AN OBJECT TRACKER

CROSS REFERENCE

The present application claims the benefit under 35 U.S.C. § 119 of German Patent Application No. DE 10 2021 205 096.4 filed on May 19, 2021, which is expressly incorporated herein by reference in its entirety.

FIELD

The present invention concerns a system and method, in particular computer implemented method for attacking and/or validating an object tracker, in particular of a multiple object tracking system.

BACKGROUND INFORMATION

Such multiple object tracking systems are commonly used in autonomous driving systems. It is hence desirable to mitigate adversarial effects of attacks on such systems.

SUMMARY

A multiple object tracking system, a deep learning based tracking system or a hybrid system comprising a deep learning based part of the tracking system could be vulnerable to adversarial attacks on a deep learning model inside the tracking system, even when an object detector that processes an input video frames is robust. In accordance with an example embodiment of the present invention, an in particular computer implemented method for determining a perturbation for attacking and/or validating an object tracker, comprises providing digital image data that comprises an object, determining with the digital image data a first feature that characterizes the object, providing in particular from a storage a second feature that characterizes a tracked object, determining the perturbation depending on a measure of a similarity between the first feature and the second feature. With this perturbation, it is unlikely, that features or feature vectors that are extracted based on an image that is perturbed with the perturbation are successfully associated with the same tracked objects by a tracking system. This perturbation is suitable to trick the tracking system into believing that a new object is present.

Preferably, in accordance with an example embodiment of the present invention, the method comprises determining a perturbed image depending on the digital image data and the perturbation. This tricks the tracking system into believing that the existing object, which is truly associated with the detected object, is not present, and also into believing that the existing object, which is truly associated with the detected object, is not present. This allows attacking the object tracker to find vulnerabilities and/or to validate or not validate the object tracker or the multiple object tracking system.

The method may comprise determining for at least one parameter that characterizes the perturbation a value that reduces and/or minimizes the similarity. The smaller the similarity is, the more likely it is, that the first feature cannot be assigned to an existing track in the object tracker. This allows testing a robustness of the object tracker.

The method may comprise providing, in particular from the storage, a plurality of features that characterize the tracked object, wherein the plurality of features includes the second feature, and determining the perturbation depending on the plurality of features. The plurality of features represents a history of the tracked object. This allows testing the robustness of the object tracker that maintains a history of the tracked object.

The method may comprise providing, in particular from the storage, a plurality of features that characterize several tracked objects, wherein the plurality of features includes the second feature, and determining the perturbation depending on the plurality of features. The plurality of features represents a history of several tracked objects. This allows testing the robustness of the object tracker that maintains a history of for several tracked objects.

The method may comprise assigning a reference identification to the object and storing the first feature assigned to the reference identification, in particular in the storage. This way, a history of tracks is created for detected objects.

The method may comprise providing a reference identification for the object, providing an image that is perturbed with the perturbation as input image to a multiple object tracking system comprising the object tracker, determining, with the object tracker, an object identification for the object, validating the object tracker when the object identification matches the reference identification or not validating the object tracker otherwise. The same objects should result in the same identifications. This allows testing the robustness based on the object identification.

The measure may comprise a metric of a distance, in particular a cosine distance, between the first feature and the second feature or between the first feature and a plurality of features that characterize tracked objects, wherein the plurality of features comprises the second feature. The metric function provides a good estimate of the similarity among the features.

Determining the first feature may comprise determining a first feature vector, wherein providing the second feature comprises providing a second feature vector, wherein the measure comprises a distance between the first feature vector and the second feature vector. This provides a good estimate for the similarity.

In accordance with an example embodiment of the present invention, a system for attacking and/or validating the object tracker is configured to perform steps in the method.

The system may comprise a feature extractor that is configured for providing the first feature, a storage that is configured for providing in the second feature.

In accordance with an example embodiment of the present invention, a computer program comprises computer readable instructions that, when executed by a computer, cause the computer to perform steps in the method.

In accordance with an example embodiment of the present invention, a non-transitory computer readable storage medium stores the computer program.

Further advantageous embodiments of the present invention are derivable from the following description and the figures.

DETAILED DESCRIPTION OF EXAMPLE EMBODIMENTS

Figure 1:
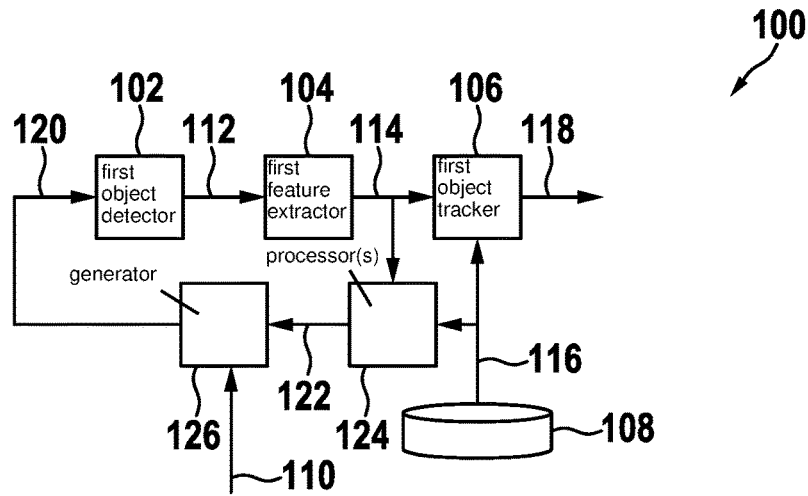
FIG. 1 schematically depicts a part of a multiple object tracking system, in accordance with an example embodiment of the present invention.

FIG. 1 schematically depicts a part of a multiple object tracking system 100.

The multiple object tracking system 100 comprises a first object detector 102, a first feature extractor 104, a first object tracker 106 and a first storage 108.

The first object detector 102 is configured for detecting an object in a digital image 110. The first object detector 102 is configured for determining for the object a region of interest. The first object detector 102 is configured for determining a first crop 112. The first crop 112 in the example is a part of the input image that is in the region of interest.

The first feature extractor 104 is configured for determining from the first crop 112 a feature 114 that characterizes the object.

The first object tracker 106 is configured for either assigning an identification to the object depending on the feature 114 or not. The first object tracker 106 is configured for assigning the identification or not depending on a similarity of the feature to a plurality of features 116 of tracked objects. Tracked objects are objects, for that the first object tracker 106 already determined an identification.

The first storage 108 is configured for storing the plurality of features 116 of tracked objects. According to the example, the first storage 108 is configured for storing matched tracks. In the example, tracked objects or tracks are stored along with their features. The plurality of features 116 may comprise a history of features that has been assigned by the first object tracker 106 to one tracked object. The plurality of features 116 may comprise a plurality of histories for multiple tracked objects.

The object tracker 106 may comprise a state estimator. The first object tracker 106 may comprise a hybrid model, e.g., of a state estimator and a deep learning neural network.

The state estimator can be a mathematical model such as Kalman filter, a convolutional neural network, CNN, a deep learning neural network, or a recurrent neural network, RNN. The state estimator is configured to estimate where the object that is detected in an image frame should appear in the next image frame. The aforementioned neural network may be trained for estimating the state and predicting the position of the object from a history of features 114 that were assigned to the object.

The object tracker 106 in the example comprises an association tracker. The association tracker is configured to decide on associations of objects that are detected in different image frames. The association tracker is configured to determine the association providing which of the objects that are detected from these image frames are the same real object. The association tracker is configured for assigning the identification to the object depending on a similarity of the feature 114 to one of the plurality of features 116 or not.

The first object detector 102 in the example is configured to receive input video frames from a camera. The first object detector 102 in the example is configured to detect multiple objects from each video frame and output a bounding box around each detected object. The bounding box indicates a region of interest.

The first object detector 102 may be a deep learning neural network. This deep learning neural network is trained for detecting multiple objects from a video frame and to output a corresponding bounding box around a detected object.

The first feature extractor 104 in the example is configured to execute an algorithm that utilizes the detection from the first object detector 102, in the example one first crop 112 per object, to create one feature 114 per object. The feature 114 characterizes the respective object. The feature 114 may characterize an appearance or a motion of the object.

The first feature extractor 104 may be a deep learning neural network. This deep learning neural network is trained for extracting the feature 114 from the first crop 112.

The deep learning neural network of the first feature extractor 104 is a model that outputs a feature score. Similar objects would have similar feature scores.

The first object tracker 106 in the example is configured to evaluate for observed detections the similarity of their respective features to previously determined features with a metric.

The metric comprises for example an Intersection over Union, IoU, between an object that was detected in a first frame and the same object at a predicted or estimated position in a second frame. In the example, a sequence of frames of a video may be processed, wherein the first frame was captured in the video before the second frame.

According to an example, the state estimator predicts that an object A (x1, y1) will be at a position (x2,y2) in the second frame.

The first object detector 102 outputs objects that are detected in the second frame.

The association tracker in may be configured for calculating an IoU between the object that was detected in the first frame at (x2,y2) and an object that was detected in the second frame at the estimated position (x2', y2'). If the IoU is above a threshold, the detected objects are considered as same object candidates.

The association tracker may be configured to calculate a similarity between the features of the same object candidates, e.g., the feature 114 and the feature 116.

The object candidates are considered as same objects if the similarity is larger than a threshold.

The first object tracker 106 in the example is configured to determine an association 118 between the detected object in a current frame of a video with the same object in a previous frame of the video.

For instance, the first object tracker 106 is configured to execute an algorithm that creates associations between the detected object in the current frame with the same object in the previous frame using the similarity.

The first object tracker 106 in the example is configured to determine a matched track of the detected object from frames comprising the object. The first object tracker 106 may be configured to initialize a new matched track if a detected object is not associated with any tracked object.

The first object tracker 106 in the example is configured to remove a matched track from tracking, if for a number of frames h of the video not object is detected that can be associated to this matched track.

In the following description, a system and a method for attacking and/or validating an object tracker is described with reference to a multiple object tracking system that uses DeepSORT:

Nicolai Wojke, Alex Bewley, Dietrich Paulus; "Simple Online and Realtime Tracking with a Deep Association Metric," https://arxiv.org/abs/1703.07402.

The method is not limited to DeepSORT. The method is applicable to different types of multiple object detection systems as well. The system is capable of attacking and/or validating other multiple object detection systems than DeepSORT as well.

In the following example, g(•) represents the object detector 102 and $f(•)$ represents the feature extractor 104. An input video sequence is denoted as $$V=[v1;v2;\ldots;vn]$$

where $vt \in R^{m \times n}$ represents an input video frame, in the example the digital image 110, at time t. A detection that is determined by the first object detector 102 at a time t is $$Dt=g(vt)$$

For a video frame at t, the detection is denoted as $$Dt(i)=f\{xi;yi;ai;wi;cig\}$$

where xi, yi represents center and wi, ai represents width and aspect ratio of the i-th bounding box. ci denotes the confidence score for the bounding box i.

This denotation is an example for a Siamese neural network. Other denotations may be used as well. For example, for a Yolo model, The first crop 112 of the detected object Dt in the video frame vt is denoted as Ct.

For feature extraction, the feature extractor $f(•)$ in the example computes a feature vector of each crop Ct and generate features Ft where $$Ft(i)=f(Ct(i))$$

For measurement of the similarity, the association tracker is configured to compute an association measurement between a feature vector at current frame Ft and a preserved feature vector from h previous frames $F_{h-1:t-1}$. Assuming Kt detected objects and Tt confirmed tracks at time t, an association matrix $Pt \in R^{T \times K}$ is defined as:

$$P_t=(F_{t-h:t-1}, F_t)$$

where θ represents a distance metric between h historical features and the current feature at time t.

Since $P_t$ can grow substantially large quickly when a big number of objects are presented in the video frames, a Kalman tracker is in the example deployed for state estimation. This improves performance and ensures associations that are more sensible.

The Kalman tracker estimates a position of the confirmed tracks in the current frame, based on a history of tracks. For each tracked object in the Kalman tracker, a Kalman filter is initialized, and as the tracked object continues to be tracked across the frames, its position estimate in the Kalman filter is updated. At frame t, each of the tracked object's Kalman Filter produces a distribution of the estimated positions of the object.

For association, these estimated positions may be used in one iteration to remove detected objects $K_t$ that are beyond a distance threshold from $P_t$. A resulting $P_t$ may be used in a next iteration.

A graph algorithm, e.g., the Hungarian algorithm, may be used to create associations between T tracks and K detections. An age of unmatched tracks may be tracked as well, e.g., incrementing in each iteration the age for unmatched tracks. An unmatched detection may be initialized as a new track.

To attack or validate the first object tracker 106, input video frame perturbations are generated on the input video frames as will be described below. Preferably, it is assumed that the first object detector 102 is a robustly trained detector. Robust in this context means, the first object detector 102 can still perfectly detect all objects in the digital image 110, even though at least a part of the digital image 110 is tampered with adversaries.

According to the example, a deep learning based feature description that comprises the history of features 114 is still attackable even when the first object detector 102 is robust.

In one example, when access is available to the system 100, the system 100 may be attacked and/or validated by determining perturbed images or perturbed crops and presenting these to the system 100. Having access to the system 100 in this context means that the target model, in particular the function $f(•)$ is known. A perturbed image 120 may be determined from the digital image 110 by adding a perturbation 122. For multiple objects, a perturbed image 120 may be determined from the digital image 110 by adding multiple perturbations. For example one perturbation per object is determined.

The system 100 may comprise at least one processor 124 for optimizing the perturbation 122. The system 100 may comprise a generator 126 that is configured for determining the perturbed image 120 depending on the digital image 110 and the perturbation 122.

The perturbed image 120 is for example determined by adding a random noise or at least one random patch to the digital image 110. The perturbed image 120 is sent to the object detector 102. The target is the association tracker. In the example, the first object tracker 106 comprises the association tracker. In an optimization the perturbation 122 is for example optimized by an optimizer that minimizes an association matrix. The association matrix will be described below.

The optimization may be repeated to update the noise or the at least one patch, until the association tracker cannot associate the same object anymore. In this case, the perturbation is effective.

When there is no access to the system 100, the system 100 can be attacked and/or validated by guessing the perturbation. Guessing the perturbation may comprise attacking the tracker using a surrogate model.

Not having access to the system 100 in this context means that the target model, in particular the function $f(•)$ of the surrogate model is known. A perturbed image 120' may be determined from the digital image 110 by adding a perturbation 122'.

Figure 2:
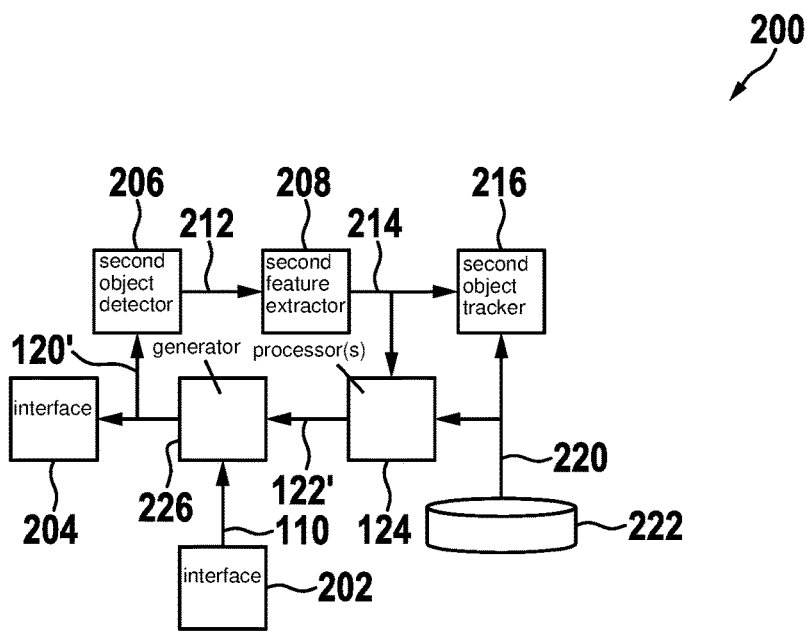
FIG. 2 schematically depicts a system for determining a perturbation, in accordance with an example embodiment of the present invention.

FIG. 2 depicts a system 200 for attacking and/or validating the object tracker with the surrogate model.

The system 200 comprises an interface 202 that is configured for providing the digital image 110 and an interface 204 for outputting the perturbed image 120'.

In the example depicted in FIG. 2, the system 200 comprises a second object detector 206 and a second feature extractor 208. The system 200 may comprise at least one processor 210 for optimizing the perturbation.

The second object detector 206 is configured for determining an input 212 for the second feature extractor 208.

The second object detector 206 is configured for detecting the object in the digital image 110. The second object detector 206 may be configured for determining for the object a region of interest. The second object detector 206 in the example is configured for determining a second crop 212. The second crop 212 in the example is a part of the digital image that is in the region of interest.

The second object detector 206 in the example comprises a surrogate for the first object detector 102. The second object detector 206 may be a surrogate deep learning neural network model. Surrogate in this context means that the deep learning neural network model is structured as described above for the first object detector 102 and trained to predict similar regions of interest as the first object detector 102. This allows to attack the surrogate to estimate where perturbations have a best possible effect for the purpose of attacking or validating the first object tracker 106.

An example of the deep neural network and the surrogate deep neural network model is a YOLO model or a Siamese model.

The second object detector 206 in the example is configured to detect the same objects and output the same or similar bounding boxes as the first object detector 102. The object detectors are for example configured with the same architecture. The input for the second feature extractor 208 is thus the same as the first crop 112 or similar to the first crop 112

In another example, the attacker has access to the output of the first object detector 102. In this example, a system for attacking and/or validating may comprise the second feature extractor 208. The input for the second feature extractor 208 in this example may be the first crop 112. The first crop 112 may be provided as the input for the second feature extractor 208 in this case.

The second feature extractor 208 is configured for mapping the input to a first feature 214 that characterizes the object.

The second feature extractor 208 in the example comprises a surrogate for the first feature extractor 104. The second feature extractor 208 may comprise a surrogate deep learning neural network model. Surrogate in this context means that the deep learning neural network model is structured as described above for the first feature extractor 104 and trained to predict similar features as the first feature extractor 104. This allows estimating features that have a best possible effect for the purpose of attacking or validating the first object tracker 106.

The system 200 may comprise a second object tracker 216. The second object tracker 216 is configured for either assigning an identification to the object depending on the first feature 214 or not. The second object tracker 216 is configured for assigning the identification depending on a similarity of the first feature 214 to a plurality of features 218 of tracked objects. Tracked objects are objects, for that the second object tracker 216 already determined an identification. The plurality of features may comprise a history of features that has been assigned by the second object tracker to one tracked object. The plurality of features may comprise a plurality of histories for multiple tracked objects.

The second object tracker 216 in the example comprises a surrogate model for the first object tracker 106. The second object tracker 216 may comprise a surrogate hybrid model, e.g., of a state estimator and a deep learning neural network. Surrogate in this context means that the hybrid model is structured and trained to predict similar tracks as the first object tracker 106. This allows estimating tracks that have a best possible effect for the purpose of attacking or validating the first object tracker 106.

The system 200 is for example configured for optimizing the perturbation depending on a measure of a similarity between the first feature 214 and a second feature or multiple features from the plurality of features. The measure is for example defined depending on the first feature 214 and the second feature or depending on the first feature 214 and the multiple features. The multiple features may include the second feature.

The system 200 is for example configured for determining the perturbed image 120'. The perturbed image is for example determined by adding a random noise or at least one random patch to the digital image 110. The system 200 may be configured to send the perturbed image 120' to the second object detector 206. The target is the association tracker. In the example, the first object tracker 106 comprises the association tracker. In an optimization the guessed perturbation 122' is for example optimized by an optimizer as follows. The system 200 may be configured for repeating this optimization and update the noise or the at least one patch, until the association tracker cannot associate multiple targeted objects, e.g., cars, multiple cars, pedestrians, then the perturbation is effective.

The guessed perturbation 122' is for example optimized by an optimizer that minimizes an association matrix. The association matrix will be described below.

The system 200 in the example is configured for providing the plurality of features 220 from a second storage 222. According to the example, the second storage 222 is configured for storing matched tracks. In the example, tracked objects or tracks are stored along with their features.

A system may comprise the system 200 and a generator 226. The generator 226 is configured for determining the perturbed image 120' depending on the digital image 110 and the guessed perturbation 122'.

The generator 226 is for example configured to output the perturbed image 120' with the size and resolution of the input image 110. The guessed perturbation 122' forms a noise in the input image 110, in particular in the region of interest.

Figure 3:
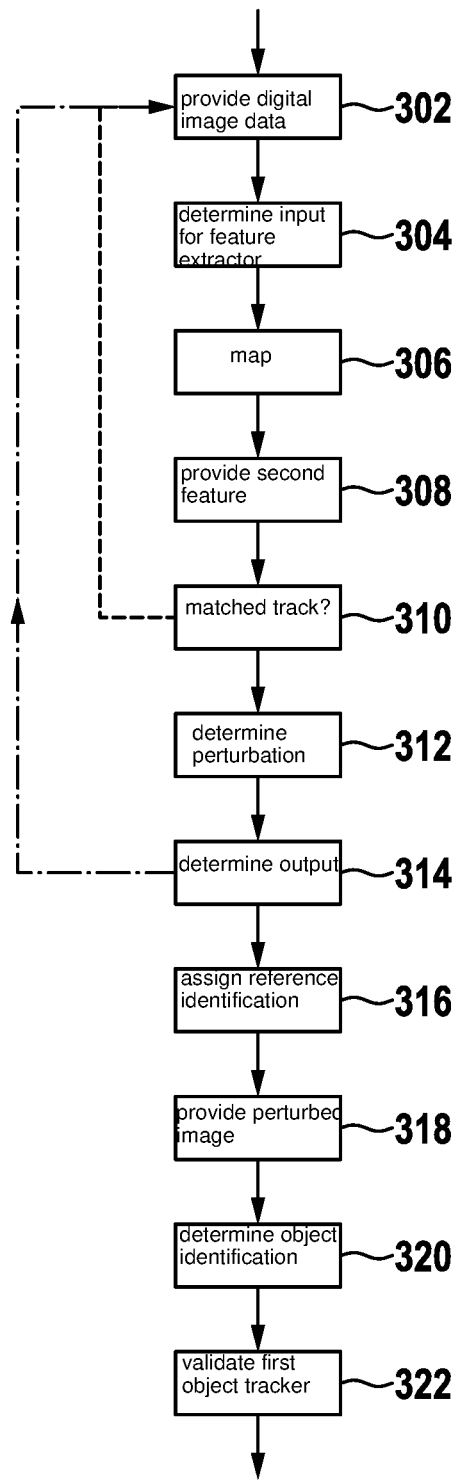
FIG. 3 schematically depicts steps in a method of determining the perturbation, in accordance with an example embodiment of the present invention.

A method for attacking the first object tracker 106 is described below with reference to FIG. 3.

The method may be computer implemented. The example below describes how the method processes one object. Multiple objects are processed with the method alike. In the exemplary method described below, the perturbation is determined in iterations. For multiple objects a plurality of perturbations is determined, e.g., one perturbation per object.

The method comprises a step 302.

In the step 302, digital image data that comprises the object is provided.

In the example, a frame is provided that comprises the digital image data. The digital image data may comprise the digital image 110 or a part thereof.

Afterwards a step 304 is executed.

In step 304, an input for a feature extractor is determined depending on the digital image data.

The input is in the example determined depending on digital image data from a region of interest in the frame that comprises the object. In the example, the object may be detected in the frame with an object detector. The region of interest may be determined by the object detector.

In the example, determining the input comprises determining a crop of the digital image data representing the region of interest.

The input is determined in an initial iteration either without perturbation or with a randomly generated perturbation.

The perturbation is in the example added to the crop in iterations to create different perturbations.

Afterwards a step 306 is executed.

In step 306, the input is mapped with the feature extractor to a first feature that characterizes the object.

Afterwards a step 308 is executed.

In step 308, at least the second feature is provided from a plurality of features that characterize a tracked object.

In the example, the plurality of features that characterize the tracked object and/or several tracked objects are provided.

In the example, the plurality of features includes the second feature.

Providing the second feature in the example comprises providing a second feature vector. In the example, a feature vector per feature in the plurality of features is provided. The second feature is for example determined by storing the first feature of a previous iteration. The second feature vector is for example determined by storing the first feature vector of a previous iteration. The plurality of features, in particular the respective feature vectors, are determined in the example for a plurality of tracked objects in a plurality of previous iterations.

Afterwards a step 310 is executed.

In step 310, it is determined if there is a matched track for the object or if there is no matched track stored in the multiple object tracking system for the object. In case there is no matched track for the object, a new track will be assigned to the object and the object will be tracked by an additional state estimator. In case there are no matched tracks stored, then the method continues at step 302. Otherwise, there is a matched track for the object and the method continues at a step 312.

In step 312, the perturbation is determined depending on the measure of the similarity between the first feature and at least the second feature.

In the example, in at least one iteration a value of the at least one parameter of the perturbation is determined that reduces the similarity in the next iteration.

In the example, the perturbation is determined in iterations until a set of parameters is found that defines a perturbation that minimizes the similarity. In the example, determining the measure in iterations may be stopped after a certain number of iteration or when a change in the values of the set of parameters from one iteration to a next iteration changes below a threshold.

The measure is for example determined with a metric function, in particular a cosine distance, between the first feature and the second feature or the plurality of features.

The perturbation is determined in the example for at least a part of the digital image data from the region of interest.

In one example, an adversarial perturbation, such as noise and patches, is determined in the region of interest, by minimizing the association matrix $P_t$.

minimize $P_t$ where $P_t = \theta(F_{t-h:t-1}, F'_t)$ $F'_t = f(Ct + \delta t)$ $\delta t \in R^{m \times n}$ where $\delta t$ is an adversarial perturbation, e.g., noise or patches, at time t.

The noise may have the same dimension as $C_t$, a patch may be significantly smaller than the dimension of C. The association matrix $P_t$ between current features $F'_t$ that are tampered with and previous features $F_{t-h:t-1}$ is minimized.

The previous features $F_{t-h:t-1}$ may be features from the first object detector 102 or features that are determined by the second object detector 206. As mentioned before $\theta: R^T \times R^K \to R^{T \times K}$ represents a metric function that estimates the similarity among the features.

In an example, a cosine similarity is used:

$$\theta(F_{t-h:t-1}, F'_t) = \frac{F_{t-h:t-1}}{\|F_{t-h:t-1}\|_2} \cdot \frac{F'_t}{\|F'_t\|_2}$$

where "•" represents a dot product operator.

In one example, given this definition, $P_t$ is be represented as follows:

s.t. $Pt \in [-1, 1]$ where −1 is highly dissimilar, and 1 is highly similar.

One example approach to decrease the cosine similarity is to find a set of parameters $\delta t$ that result in a zero cosine similarity, i.e. no similarity between the current features $F'_t$ and the previous features $F_{t-h:t-1}$.

That implies the features obtained from $f(\bullet)$ yield a close to zero cosine similarity with h historical features.

One example to decrease the cosine similarity is to find a negative cosine similarity in a way that the association matrix is optimized towards minus Pt.

A multiple object tracking system may have a similarity score threshold $\lambda$. In this case all features having a similarity score that is below the threshold $\lambda$ may be ignored. This way, the set of perturbation parameters $\delta t$ may be optimized with a sparse association matrix Pt, e.g., a matrix P't having elements P't(i, j)

$$P't(i, j) = \begin{cases} Pt(i, j) & \text{if } Pt(i, j) \geq \lambda \\ 0, & \text{otherwise} \end{cases}$$

In one example, the adversaries may be directly added on the detection output $D_t$ instead of adding them to the crops Ct. In this example the crops Ct are determined from the detection output Dt that is perturbed with the set of perturbation parameters.

Afterwards, optionally a step 314 is executed.

In step 314, an output is determined depending on the digital image data and the perturbation.

Determining the output may comprise modifying at least a part of the digital image data with the perturbation. The output may be an output image, in particular the perturbed image.

In the example, the output is determined depending on digital image data from the region of interest. In an exemplary perturbed image, the perturbation is added to the digital image data from the region of interest.

In the example, determining the perturbation comprises either providing a noise for the crop or for a part of the crop.

The noise that is provided for the crop may have the size of the crop.

The noise that is provided for the part of the crop may have a smaller size than the crop.

The perturbed image is suitable for attacking the first object tracker 106. A plurality of perturbed images may be created. The method may continue with step 302 to create the plurality of perturbed images.

For validating the first object tracker 106, the method may comprise the following optional steps. An example for one perturbed image is described. These steps may be performed based on the plurality of perturbed images alike.

In a step 316, a reference identification is assigned to the object and the first feature is stored assigned to the reference identification.

The step 316 may comprise providing the reference identification for the object.

In a step 318, the perturbed image is provided as input to the multiple object tracking system to attack the association tracker.

In a step 320, an object identification for the object is determined with this input by the first object tracker 106.

In a step 322, the first object tracker 106 is validated when the object identification matches the reference identification or not validated otherwise.

$$F'_t F_{t-h:t-1}$$

The system and method may be deployed for attacking and/or validating an autonomous driving system, a video surveillance system, e.g., at for an airport security application system, or a crowd behavior analysis system that comprises an object tracker.

What is claimed is:

1. A computer implemented method for determining a perturbation for attacking and/or validating an association tracker, the method comprising the following steps:
   providing digital image data that includes an object;
   determining with the digital image data a first feature that characterizes the object;
   providing from a storage a second feature that characterizes a tracked object; and
   determining the perturbation depending on a measure of a similarity between the first feature and the second feature;
   providing a reference identification for the object;
   providing an image that is perturbed with the perturbation as an input image to a multiple object tracking system including the object tracker;
   determining, with the object tracker, an object identification for the object; and
   validating the object tracker when the object identification matches the reference identification and otherwise not validating the object tracker.

2. The method according to claim 1, further comprising: determining a perturbed image depending on the digital image data and the perturbation.

3. The method according to claim 1, further comprising: determining for at least one parameter that characterizes the perturbation a value that reduces and/or minimizes the similarity.

4. The method according to claim 1, further comprising: providing, from the storage, a plurality of features that characterize the tracked object, wherein the plurality of features includes the second feature; and
   determining the perturbation depending on the plurality of features.

5. The method according to claim 1, further comprising: providing, from the storage, a plurality of features that characterize several tracked objects, wherein the plurality of features includes the second feature; and
   determining the perturbation depending on the plurality of features.

6. The method according to claim 1, further comprising: assigning a reference identification to the object; and storing the first feature assigned to the reference identification, in the storage.

7. The method according to claim 1, wherein the measure includes a metric of a cosine distance between the first feature and the second feature or between the first feature and a plurality of features that characterize tracked objects, wherein the plurality of features include the second feature.

8. The method according to claim 1, wherein the determining of the first feature includes determining a first feature vector, wherein the providing of the second feature includes providing a second feature vector, and wherein the measure includes a distance between the first feature vector and the second feature vector.

9. A system configured to determine a perturbation for attacking and/or validating an association tracker, the system configured to:
   provide digital image data that includes an object;
   determine with the digital image data a first feature that characterizes the object;
   provide from a storage a second feature that characterizes a tracked object; and
   determine the perturbation depending on a measure of a similarity between the first feature and the second feature;
   provide a reference identification for the object;
   provide an image that is perturbed with the perturbation as an input image to a multiple object tracking system including the object tracker;
   determine, with the object tracker, an object identification for the object; and
   validate the object tracker when the object identification matches the reference identification and otherwise not validating the object tracker.

10. The system according to claim 9, wherein the system includes a feature extractor that is configured for providing the first feature, and the storage that is configured for providing the second feature.

11. A non-transitory computer readable storage medium on which is stored a computer program for determining a perturbation for attacking and/or validating an association tracker, the computer program, when executed by a computer, causing the computer to perform the following steps:
   providing digital image data that includes an object;
   determining with the digital image data a first feature that characterizes the object;
   providing from a storage a second feature that characterizes a tracked object; and
   determining the perturbation depending on a measure of a similarity between the first feature and the second feature;
   providing a reference identification for the object;
   providing an image that is perturbed with the perturbation as an input image to a multiple object tracking system including the object tracker;
   determining, with the object tracker, an object identification for the object; and
   validating the object tracker when the object identification matches the reference identification and otherwise not validating the object tracker.

* * * * *